Patented Jan. 29, 1929.

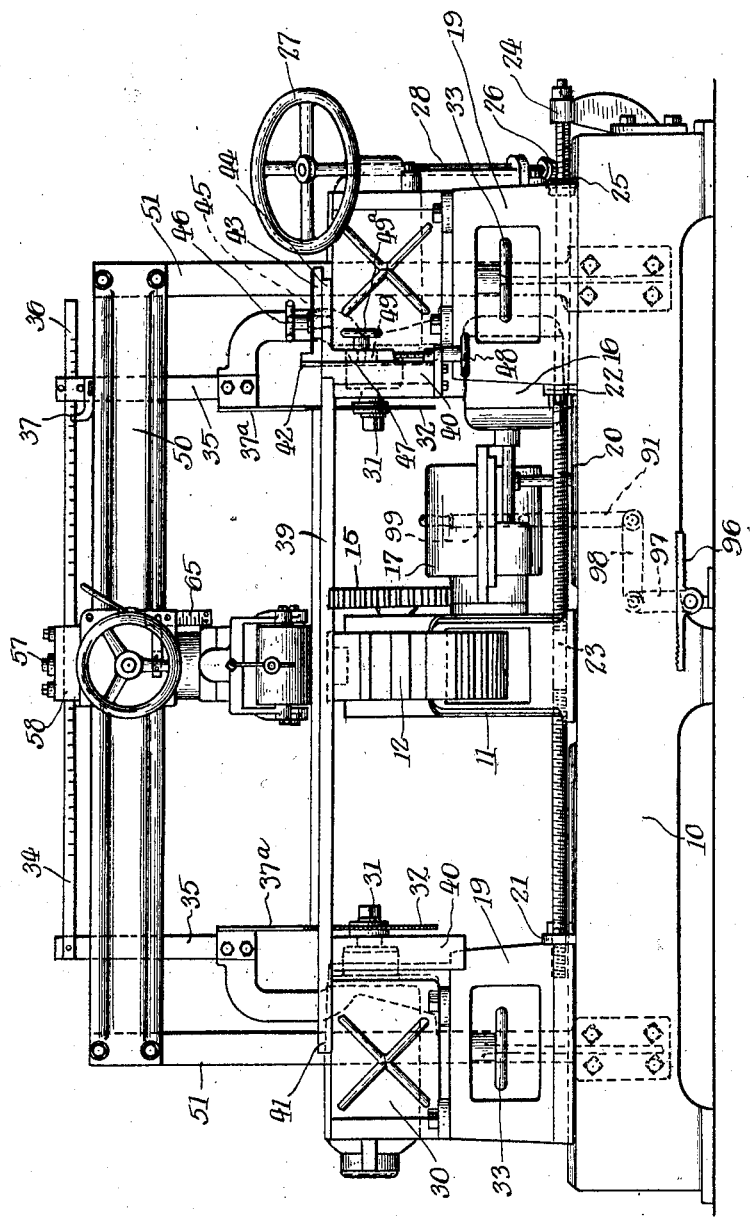

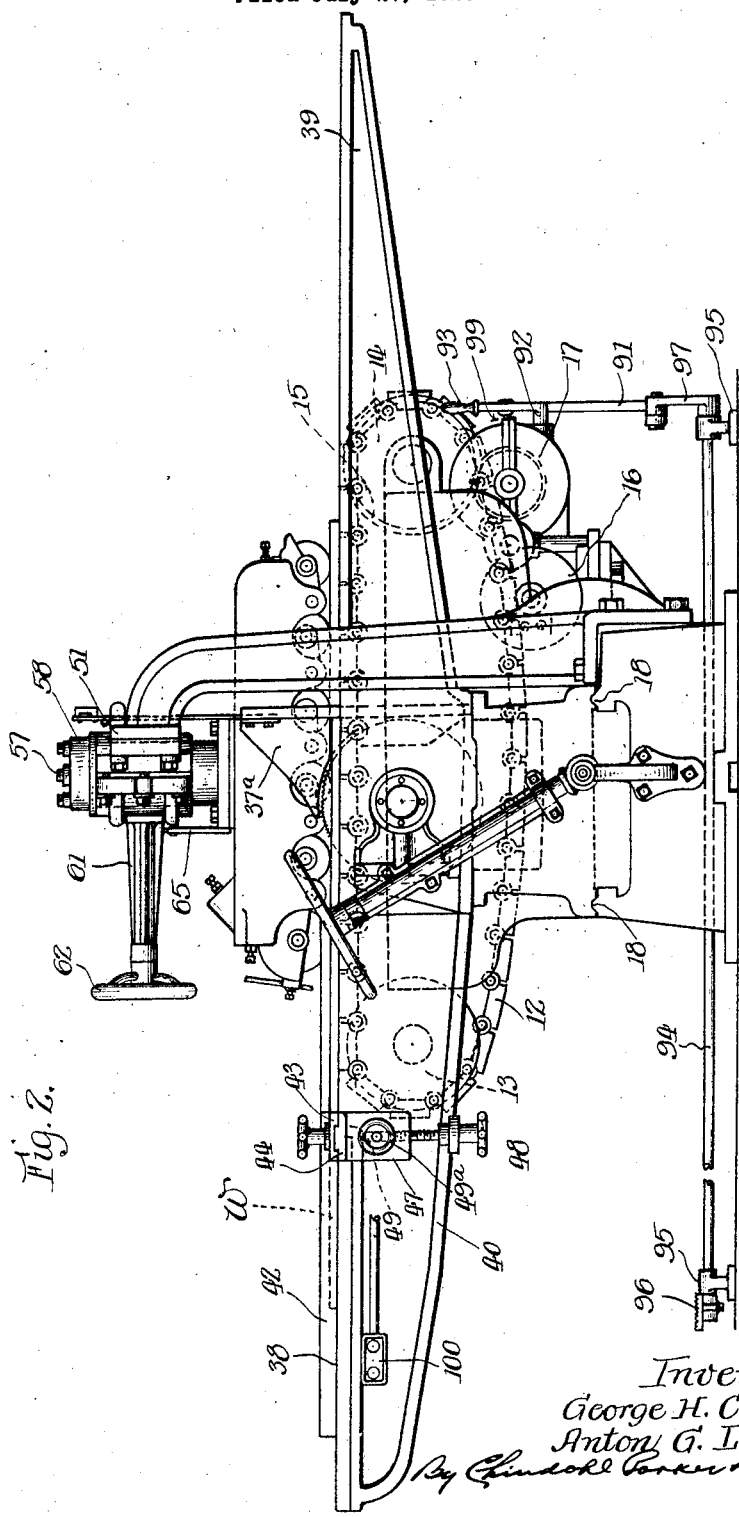

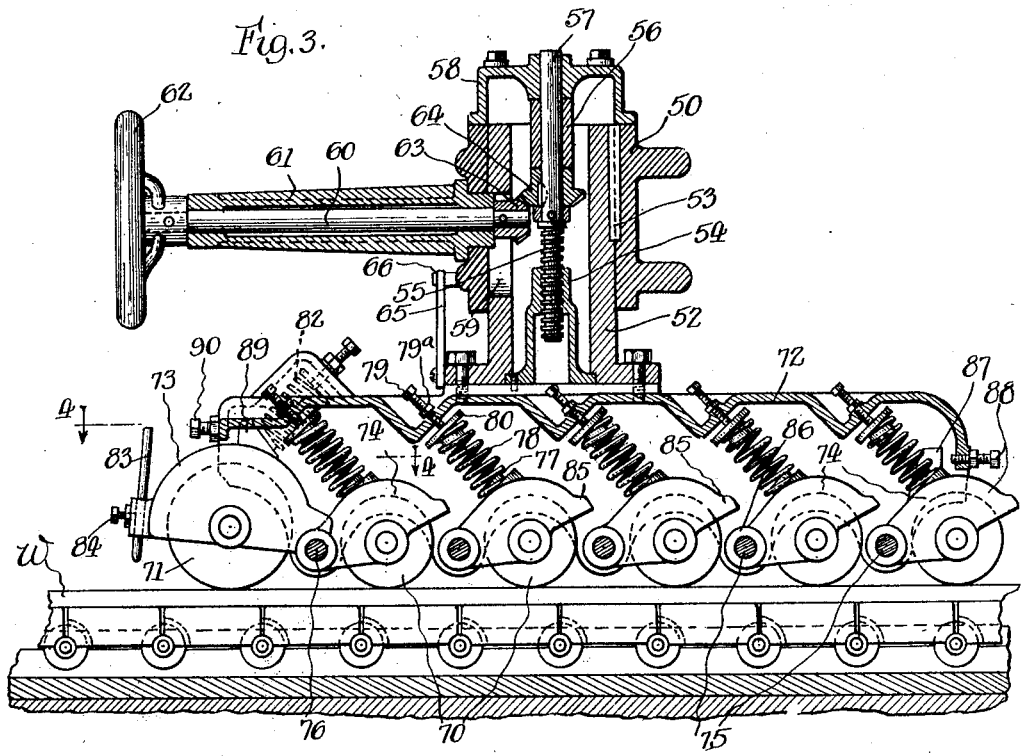
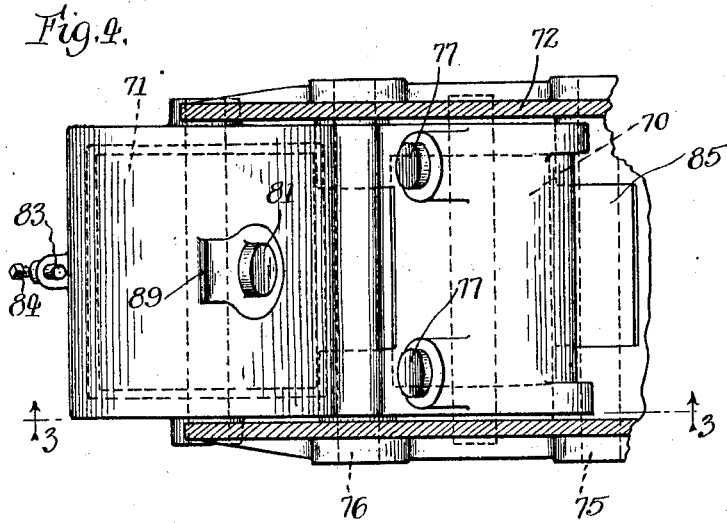

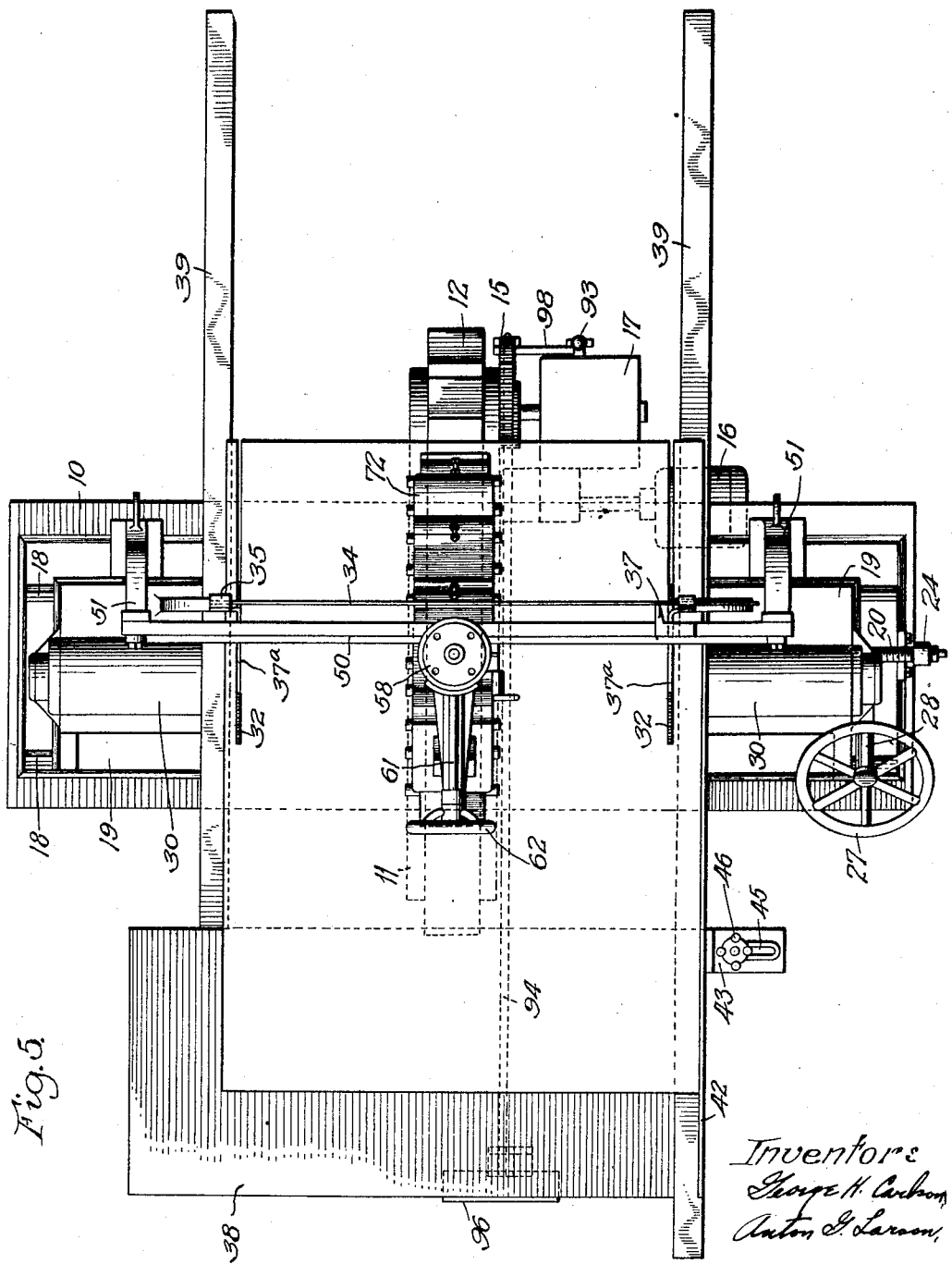

1,700,400

UNITED STATES PATENT OFFICE.

GEORGE H. CARLSON AND ANTON G. LARSON, OF ROCKFORD, ILLINOIS, ASSIGNORS TO EKSTROM, CARLSON & CO., OF ROCKFORD, ILLINOIS, A CORPORATION OF ILLINOIS.

WOOD-SAWING MACHINE.

Application filed July 27, 1925. Serial No. 46,208.

This invention relates to wood sawing machines and particularly to a machine for sizing panels and the like.

In sizing panels it is important that the opposite sides be cut parallel. This is particularly true for panels of considerable size. In such panels it is also necessary that the sides be straight as well as parallel. Where a large number of panels are produced at a time, the care and attention requisite to ensure the above mentioned qualities adds considerable to the expense of production and increases the number of workmen required.

It is the aim of the present invention to provide a panel sizing machine which is accurate and speedy and capable of handling very large panels.

It is a particular object of the invention to provide a machine having a conveyor centrally disposed as regards the finished panel to move the work past two opposing saws which are adjustable equidistantly toward and away from the conveyor according to the width of the panel desired.

Still other and ancillary objects and advantages of the invention will be apparent from the ensuing description of an exemplary embodiment of the invention disclosed in the accompanying drawings especially adapted for carrying out the foregoing objects of speed and accuracy.

In the drawings, Figure 1 is a front view of the machine.

Fig. 2 is a side view of the machine.

Fig. 3 is a cross sectional view of the pressure roller device on line 3—3 of Fig. 4.

Fig. 4 is a detail view of a portion of Fig. 3 along the line 4—4 of Fig. 3.

Fig. 5 is a plan view of the machine.

It is to be understood that the invention is not limited to the precise construction herein disclosed, but that other embodiments and modifications in construction are contemplated in practicing the invention as set forth in the appended claims.

The invention comprises generally an elongated table having guides and a conveyor to carry work through the machine in a direction true to the guides at a high speed past adjustably fixed saws. The machine is provided with quick acting controls and with rapid and convenient adjusting mechanisms to accommodate the machine to different sized panels. The machine is further adapted to receive one panel after another in abutting succession to minimize all waste of time in using the machine and to ensure a maximum output from a given equipment.

The machine has a base 10 in the center of which is fixedly positioned a mounting 11 for an endless conveyor chain 12. The chain extends transversely of the length of the base and projects beyond the sides thereof lengthwise of the machine (Fig. 2). Suitable sprocket wheels 13 and 14 carry the chain, the sprocket wheel 14 being rigid with a gear wheel 15 driven from a motor 16 through a suitable gear casing 17.

The base has ways 18 longitudinally thereof from the center mounting 11 to the ends of the base. Upon the ways there are saw carriages 19 movable toward and away from the center by a common feed screw 20. The feed screw (Fig. 1) is left hand threaded at the left hand end and engages with a left hand nut 21 on the left hand carriage 19. The feed screw 20 is right hand threaded at the right hand end of the base and engages a right hand nut 22 on the right hand carriage 19. The feed screw bears in the center mounting 11 at 23 and in a bracket 24 at the right hand end of the base. Thus rotation of the screw moves both saw carriages 19 simultaneously toward and away from the center.

Means is provided for rotating the screw and this is preferably carried by one of the movable saw carriages or saw carrying heads. The screw 20 is longitudinally grooved at the right hand end and has splined thereon a bevel gear 25 slidable over the threads of the screw. The gear 25 is rotatably mounted with respect to the carriage 19. A bevel gear 26 meshes with the gear 25, there being a hand wheel 27 and a shaft 28 carrying the gear 26 mounted on the side of the carriage 19 for operating the bevel gears.

Within each carriage 19 there is constructed a motor housing 30 indicated only generally in the drawings, within which there is a motor shaft 31 carrying a circular saw 32. A motor of any preferred type is contained within the housing. The motor housing is preferably vertically adjustable with reference to the base of the machine by a hand wheel 33. The details of construction of this portion of the mechanism are not fully disclosed in the drawings since they form no part of the invention.

Horizontal adjustment of the feed screw 20 moves the saws 32 toward and away from each other. As a means of determining the distance between the two saws, a scale 34 is employed mounted above the machine. The saw carrying heads 19 have brackets 35 extending upwardly therefrom. One bracket has one end of a scale 34 fixed thereto while the other bracket permits the free end 36 of the scale to slide therethrough. A pointer 37 is provided adjacent the latter to indicate the exact distance on the scale which separates the saws. The brackets 35 carry saw guards 37ª which are plates extending away from the saw at the rear side thereof and in the plane of the saw. The guards are so shaped that the saw is exposed to oncoming work at the front side of the guard but is covered at the rear side.

A table surface is provided for the work. This surface comprises a flat planar table 38 at the front end of the machine and projecting arms 39 at the rear side of the machine, the arms 39 having tops coextensive with the surface of the table 38. The table 38 is supported by brackets 40 at each side of the machine. Each bracket 40 and one arm 39 constitute preferably a single casting which is carried rigidly by the saw carriage 19 so as to be movable therewith when the saws are adjusted. The table surface 38 is composed of a suitable plate which has the right hand end fixed to the right hand bracket 40. The left hand end 41 of the table 38 is free to slide over the left hand bracket 40 when the saws are adjusted horizontally.

Alongside the right hand end of the table there is a vertical guide 42 or gage to serve both as a guide and as a stop for the panel to be cut. The guide or gage has a vertical and a horizontal adjustment. It is secured to a horizontal plate 43 resting on a horizontal bracket 44. The plate 43 has an elongated slot 45 therein through which passes the shaft of a hand screw 46 which is threaded into the bracket 44 to clamp the plate 43 to the bracket 44. The slot 45 permits motion of the plate 43 to the right and left in Fig. 1. The bracket 44 is vertically adjustable. It is formed as a right angular bracket having the vertical plate 47 slidable on the main bracket 40. The end of the vertical plate 47 is tapped to receive a hand screw 48 carried by the bracket 40 for vertical adjustment of the bracket plate 47. A vertical slot 49 is provided in the plate 47 through which a clamping screw 49ª clamps plate 47 to the bracket 40 for a given vertical adjustment.

Above the table there are mounted pressure rollers which hold the work firmly against the conveyor chain 12 to carry it past the saws. The pressure rollers are mounted from a horizontal cross beam 50 above the machine supported by brackets 51 rising from the base 10. The pressure rollers are substantially a unitary device carried by a shank member 52 which slides vertically in a hole provided in the beam 50. A key 53 between the shank and the beam prevents rotation between the two thus keeping the unitary roller device in alinement in the machine in a line parallel to the planes of the saws. The inside of the shank 52 is hollow and is provided with a fixed nut 54 near the bottom, into which a rotatable feed screw element 55 is threaded to effect vertical adjustment. The screw has a shaft portion 57 which is mounted in a sleeve 56 formed integrally with a cap structure 58 that is bolted to the top of the beam. A portion of the shank 52 has a vertical slot 59 therein on the front side to provide clearance for a shaft 60 extending into the interior of the hollow shank and mounted in a housing 61 secured to the front of the beam 50. A hand wheel 62 at one end of the shaft turns a bevel gear 63 at the other end. The latter gear meshes with a bevel gear 64 carried by a feed screw shaft 57. A scale 65 rigid with the shank slides through a socket or guide 66 attached to the beam to indicate the vertical adjustment of the pressure roller device.

The pressure roller device has rollers 70 and 71 contained in a single housing 72 attached to the shank 52. Each roller bears in a second housing or mounting of hood-like character which is mounted in the main housing 72. The front end roller 71 is carried by mounting 73 while the remaining rollers 70 are mounted in the mountings 74, each being pivoted as shown at 75 to the main housing. The front housing 74 and the front end housing 73 are pivoted on the same axis 76 in the main housing so that they swing in opposite directions. Each hood mounting 74 has two spaced bosses 77 thereon over which fits the end of coiled springs 78. The main housing 72 has bolts 79 with lock nuts 79ª. A head 80 on the inner end of each bolt retains the springs 78 in compression. The end of the front roller mounting 73 has a central boss 81 and a spring 82 having a relation to the main housing similar to the relation of the two springs 78 of the other mountings to the housing 72. The provision of a single spring on the front roller permits it to pass rearwardly between the two springs 78 of the adjacent roller. Thus the housing is provided with projecting rollers at each end. The mounting 73 carries a gage pin 83 vertically adjustable in a set screw clamping device 84.

In order to limit the motion of the individual roller mountings caused by the action of the springs thereon when no work is in the machine, stop means or limiting devices become effective. Each of the intermediate roller housings has a projecting nose 85 which swings in a path to hit the hub 86 of the adjacent housing. The rear end mounting 74 is provided with a lug 87 within the main housing and an adjustable screw 88 is located in the casing 72 in the path traversed by the lug 87. A similar lug 89 is formed on top of the front roller mounting 73 and likewise an adjustable stop screw 90 therefor.

The gear casing 17 contains a suitable clutch and speed mechanism (not shown) to permit stopping and moving the conveyor 12. Preferably a two speed mechanism is employed, the details of construction of which are omitted since they form no part of the invention. A clutch lever 91 turns on a pivot 92 entering the gear casing to provide a central neutral position (Fig. 2) and left and right positions corresponding to the two speeds. The lever is preferably foot operated, but is also provided with an extension 93 for manual control. The foot operation is effected by a rock shaft 94 extending from the rear to a convenient location at the front of the machine. Floor fixtures 95 are provided as bearing supports for the rock shaft 94. The forward end of the rock shaft has a dual tread 96 which in the neutral position is horizontal. Moving the tread downward at either right or left sides moves the lever 91 through a crank arm 97 on the end of rock shaft 94 and through a link 98 from the crank arm to the lever 91. A spring pressed button 99 carried by the lever holds the clutch lever in recesses corresponding to its three positions. Besides the foot speed control for the conveyor an electric control 100 may be positioned on the bracket 40 at the front of the machine to control the motor for the saws 32 and the motor 16 for the conveyor.

In using the machine particularly for large sized panels a very high productive capacity for the machine can be effected. Panels are fed rapidly to the table 38 and are placed against the guide 42. The pressure roller device is adjusted vertically according to the thickness of the panel. In the drawings the work is represented by the letter W. The work is pushed along the front table alongside the guide 42 until it is grasped by the conveyor and the roller device, both of which are alined with the guide 42 along the length of the machine to move the work positively and linearly past the two saws 32 to ensure that the sides of the panel are cut perfectly straight and parallel. A second piece of work can follow the first piece without any delay between the two. The machine is capable of operation at high speed such, for example, fifty-two feet of work per minute at one side of the tread 96, and sixty-six feet per minute at the other side of the tread 96. Because of the adaptability of the machine to work of different sizes and because of its high speed, the increased capacity of the machine over others greatly reduces the overhead, the time, and the labor cost in the manufacture of panels.

We claim as our invention:

1. A sawing machine having, in combination, a stationarily positioned work conveyor, a pair of saws positioned laterally of and on opposite sides of said conveyor, a pair of carriages operatively supported for lateral adjustment of position relative to said conveyor, each of said saws being operatively mounted on one of said carriages, said conveyor being located centrally laterally of the machine and extending past the saws from front to rear, a work supporting rail mounted on each of said carriages in association with said saws respectively and extending parallel to said conveyor and beyond the feeding in end of the conveyor, and a table frontwardly positioned across said rails in adjustable relation thereto and flush with the work supporting surfaces thereof.

2. A sawing machine having, in combination, a work conveyor, a pair of saws positioned laterally of and on opposite sides of said conveyor, a pair of carriages operatively supported for lateral adjustment of position relative to said conveyor, each of said saws being operatively mounted on one of said carriages, said conveyor being located centrally both longitudinally and laterally of the machine and extending past the saws from front to rear, and a work supporting rail mounted on each of said carriages in association with said saws respectively and extending parallel to said conveyor and beyond the feeding in end thereof.

3. A sawing machine having, in combination, a centrally positioned work conveyor, a pair of saws positioned laterally of and on opposite sides of said conveyor and at equal distance therefrom, a pair of carriages movably supported for lateral adjustment of position relative to said conveyor, each of said saws being operatively mounted on one of said carriages, a work supporting rail mounted on each of said carriages in association with said saws respectively and extending parallel to said conveyor, and a table frontwardly positioned across said rails flush with the work supporting surfaces thereof, said table being secured to one of said rails and slidable freely upon the other of said rails.

4. A sawing machine having, in combination, a base, a pair of carriages movably supported on said base for lateral adjustment of position relative to each other, a pair of saws operatively mounted on said carriages, a work supporting rail mounted on each of said carriages in association with said saws respectively, and a table frontwardly positioned across said rails and flush with the work supporting surfaces thereof, said table being secured to one of said rails and being freely movable in relation to the other of said rails.

5. A sawing machine having, in combination, a conveyor device arranged to engaged the top and bottom of a work piece at points spaced longitudinally of the conveyor device, a pair of saws equidistantly positioned laterally of and on opposite sides of said conveyor, said conveyor extending beyond the saws from front to rear, work supporting rails one mounted adjacent to and in association with each of said saws respectively and extending parallel to said conveyor beyond the feeding in end thereof, a table frontwardly positioned across said rails in adjustable relation thereto and flush with the work supporting surfaces thereof, and a lateral guide supported on one of said rails laterally of said table, said guide being horizontally and vertically adjustable in position relative to said table.

6. A sawing machine having, in combination, a base, a work conveyor positioned stationarily in a central position upon said base and having presser mechanism in association therewith, a pair of carriages operatively supported on said base on opposite sides of said work conveyor and adapted for lateral adjustment of position in substantially equidistant relation to said conveyor, a saw operatively mounted on each of said carriages respectively, and a work supporting rail mounted on each of said carriages in association with said saws respectively and extending susbstantially parallel to said conveyor.

In testimony whereof we have hereunto affixed our signatures.

ANTON G. LARSON.
GEORGE H. CARLSON.